United States Patent
Krieg et al.

[11] Patent Number: 5,436,799
[45] Date of Patent: Jul. 25, 1995

[54] MODULAR SWITCHING-ELEMENT BLOCK

[75] Inventors: Karl-Heinz Krieg, Ebersbach; Siegfried Klink, Schönaich; Uwe Manzke, Weil der Stadt; Michael Schulcz, Böblingen, all of Germany

[73] Assignee: Mercedes-Benz AG, Germany

[21] Appl. No.: 357,993

[22] Filed: Dec. 16, 1994

Related U.S. Application Data

[63] Continuation of Ser. No. 79,927, Jun. 23, 1993, abandoned.

[30] Foreign Application Priority Data

Jul. 3, 1992 [DE] Germany .......... 42 21 898.5

[51] Int. Cl.⁶ .......... H05K 5/00; H01H 85/02
[52] U.S. Cl. .......... 361/733; 337/186; 361/628; 361/629; 361/631; 361/643; 200/307
[58] Field of Search .......... 361/628–632, 361/634, 642–643, 652, 655–656, 673, 728–729, 733; 439/598, 621–622; 174/52.1; 200/307; 337/186, 198, 208–209

[56] References Cited

U.S. PATENT DOCUMENTS

| | | | |
|---|---|---|---|
| 3,289,049 | 11/1966 | Middendorf | 361/643 |
| 3,743,892 | 7/1973 | Fritz et al. | 361/652 |
| 4,956,748 | 9/1990 | Yamamoto et al. | 439/638 |
| 4,959,023 | 9/1990 | Watanabe et al. | 439/595 |
| 5,035,644 | 7/1991 | Nakazato et al. | 439/372 |
| 5,041,017 | 8/1991 | Nakazato et al. | 439/509 |
| 5,171,293 | 12/1992 | Umemoto et al. | 439/622 |

FOREIGN PATENT DOCUMENTS

| | | |
|---|---|---|
| 8034702 | 4/1981 | Germany . |
| 3331616 | 4/1985 | Germany . |
| 3334097 | 4/1985 | Germany . |
| 3230412 | 8/1986 | Germany . |
| 3728756 | 11/1988 | Germany . |
| 3903818 | 8/1989 | Germany . |

Primary Examiner—Bot L. Ledynh
Attorney, Agent, or Firm—Evenson, McKeown, Edwards & Lenahan

[57] ABSTRACT

A modular switching-element block which comprises at least one base body having plug-in locations for switching elements, such as electrical switches, and is fitted with a base body which is split into a plurality of base-body modules which can be plugged into one another. In comparison with a common base body, this arrangement makes possible greater variability of the number of plug-in locations, with respect to freely selectable special fits with switching elements, and reduces the advance-provision cost for a standard fit.

7 Claims, 2 Drawing Sheets

MODULAR SWITCHING-ELEMENT BLOCK

This application is a continuation of application Ser. No. 08/079,927, filed on Jun. 23, 1993, now abandoned.

BACKGROUND AND SUMMARY OF THE INVENTION

The present invention relates to a modular switching-element block having at least one base body and a plurality of plug-in locations in the base body for holding electrical switches and the like.

DE 80 34 702 U1 shows a block which is provided for switches each being combined completely in individual housings. The switches constitute switching elements which, for their part, have external contacts which make electrical contact with conductor tracks on a printed-circuit board when the switches are inserted into plug-in locations in a base body provided with the printed-circuit board. The printed-circuit board can itself, in turn, be connected via a multiple plug to a vehicle on-board power system.

A comparable switching-element block is also described in DE 37 28 756 C1. Its base body comprises the stationary contacts of switches, as well as conductive connections, in the form of conductor tracks, between the individual switching elements, and the switching contacts of the switches can be inserted together with the associated operating keys into plug-in locations provided in the base body. The conductor tracks make unnecessary individual contact with the switches which can optionally be inserted. The complete switching-element block can be connected via a central multiple plug to a cable harness, especially of a vehicle on-board power system.

Although it is largely possible in both known arrangements to fit the base body with switching elements as desired, a maximum number is, however, rigidly predetermined by the plug-in locations in the base body. With respect to a greatly varying numbers of switching elements, as a result of a wide range of vehicle fits which can be selected freely by customers, it may be undesirable for cost and space reasons to always have to provide the maximum number of plug-in locations in a base body, even for a relatively small number of switching elements which are to be plugged in (e.g., a maximum of nine plug-in locations in the case of a production fit or standard fit of a vehicle having 4 switching elements).

A power distributor, which can be assembled like a puzzle from a plurality of individual modules, for the wiring of motor vehicles is also described in DE 33 34 097 C1. A first group of modules is inserted into a base box, and further modules can be placed onto this first group and can also be bridged electrically. However, the base box is designed to be the same size for all conceivable combinations of the modules.

Finally, DE 32 30 412 C2 discloses a device for electrical apparatuses for the external inputting and/or display of information items, in the case of which switching and/or display elements can be arranged, combined with one another as required, on one or more bases in a common mounting frame.

The present invention has an object of increasing the variability of the number of plug-in locations in the case of a modular switching-element block type.

This object has been achieved according to the present invention by providing a first base-body module with a sufficient number of plug-in locations to hold a standard fit of switching elements, and at least one further base-body module provided with a plug holder for the first base-body module and a number of plug-in locations arranged alongside thereof, for additional switching elements.

An advantageous feature of the present invention is that, not only are Just the switching elements themselves regarded as modules, but the base body is also split into a plurality of modules having a number of plug-in locations. These modules, depending on the requirement, are plugged into one another at plug-in locations and possibly make electrical contact with one another during insertion.

The base-body modules are preferably constructed such that their plug-in locations lie in a straight line after the modules have been Joined to one another. If, for example, the switching elements are electrical switches with control keys, then the latter can be plugged through recesses in a cockpit lining. The recesses are provided depending on the number of switching elements, and then provide the user of the vehicle with a harmonious overall image.

A further advantage of the splitting of the base body into modules in accordance with the present invention is that at least one module can comprise an electronic controller which is electrically connected to the switching elements which can be inserted. This module, which is available for a special fit, preferably forms the final extension stage of the switching-element block and, for its part, also has a plug holder for a smaller base-body module.

BRIEF DESCRIPTION OF THE DRAWINGS

These and other objects, features and advantages of the present invention will become more apparent from the following detailed description thereof when taken in conjunction with the accompanying drawings wherein.

DETAILED DESCRIPTION OF THE DRAWINGS

Figure 1A:
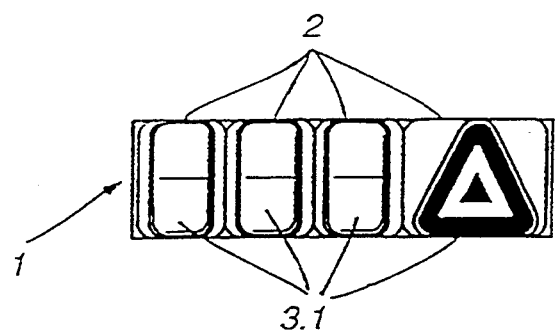
FIG. 1A is an elevational view of a base-body module having four plug-in locations with rocker switches and a hazard-flash switch in accordance with the present invention.
Figures 1B, 1C:
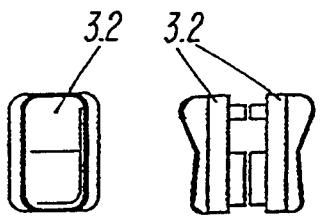
FIGS. 1B and 1C are, respectively, front and side views of isolated switching elements in the form of electrical rocker switches.
Figure 1D:
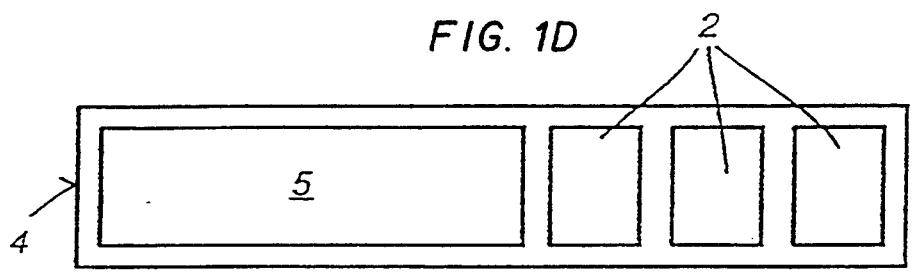
FIG. 1D is an elevational view of another embodiment of the base-body module which have additional plug-in locations and hold the base-body module of FIG. 1, but with the switching elements not illustrated.
Figure 1E:
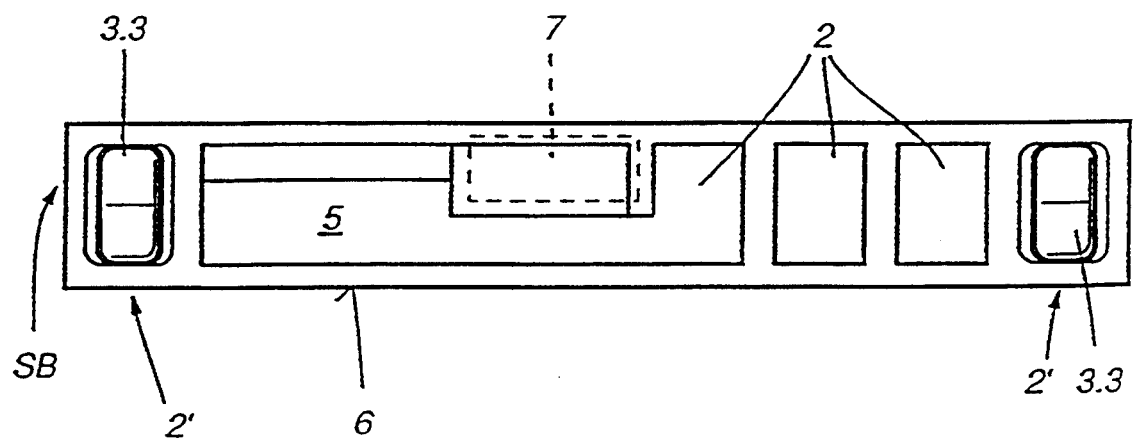
FIG. 1E is an elevational view of another embodiment of the base-body module

A switching-element block SB comprises a first base-body module 1 (shown at the top of FIG. 1) having four plug-in locations 2 (not shown in detail), for several switching elements 3.1. Three of the plug-in locations 2 are in this embodiment constructed as electrical rocker switches for controlling vehicle functions such as windscreen wipers, belt positioners, central locking and the like, while the fourth is a hazard-flasher switch which is characterized by the triangular shape of its push button.

The number of switching elements 3.1 forms a production fit or standard fit of all vehicles of a model type, it still being possible to select different functional allocations of the plug-in locations 2. Nevertheless, common cabling for the switching elements 3.1 can be provided inside the first base-body module 1, and this cabling contributes to a considerable reduction in the number of leads to be supplied from the exterior.

The first base-body module 1 is installed behind a cockpit lining. The switching element operating keys, which are provided with functional symbols, are plugged through recesses in the cockpit lining as individual components of the switching-element block, which are visible to the user of the vehicle, and then lie in a straight line.

For special-fit requests which arise frequently, the number of plug- in locations 2 for further switching elements 3.2, which are here removed from the plug-in locations 2, can, in a first extension stage, be increased by three in a simple manner, with the insertion of a second base-body module 4 (shown in the middle of FIG. 1) which has these three additional plug-in locations. A plug holder 5 in the second module 4 is dimensioned such that the first base-body module 1 can be inserted therein and, thereafter, all the plug-in locations 2 once again lie in a straight line. The same applies, of course, to the operating keys of the switching elements 3.1 and 3.2.

Finally, for a further extension of the number of plug-in locations 2, a third base-body module 6 (shown at the bottom of FIG. 1) is available which, as well as two additional plug-in locations 2' which are fitted with switching elements 3.3 which are constructed as rocker switches, in turn comprises a plug holder 5 for the first base-body module 1, as well as three plug-in locations 2, which correspond to the plug-in locations 2 of the second base-body module 4 for the (optionally plug-in) switching elements 3.2.

It would, of course, also be within the scope of the present invention for the second base,body module and the first base-body module, which is plugged therein, to be inserted jointly into the third module 6, whose plug holder 5 would then have to be constructed to hold the second module 4. For this purpose, the three plug-in locations 2 in the third module 6 could be omitted. However, such a configuration would occupy a greater component depth (in the direction of the insertion direction) than that selected here.

A significant advantage of the above-described arrangement is that there is no need for the maximum number of plug-in locations for switching elements to be provided in every vehicle as an advance provision in a common base body.

The third base-body module 6 also offers space within its volume for the accommodation of an electronic controller 7 which can be electrically connected to the plugged-in switching elements 3.3 (indicated by dashed lines). For example, it may relate to a controller for the power of a seat-heating installation which can be switched on and off again in a plurality of stages by the switching elements 3.3.

The plug-in locations 2 can intrinsically all be of identical configuration or different plug-in location shapes can be provided in order unambiguously to prescribe specific functional allocations. Mechanical shape codes can possibly prevent, in a known manner, the switching elements from being installed incorrectly. For example, the plug-in locations 2' in the third base-body module 6 are slightly smaller than the plug-in locations 2; the switches 3.3 which can be used here are not designed for power currents but only for control currents of the controller 7. Irrespective of this, their operating keys are the same size as those of the other switches, for stylistic and ergonomic reasons.

Figure 2:
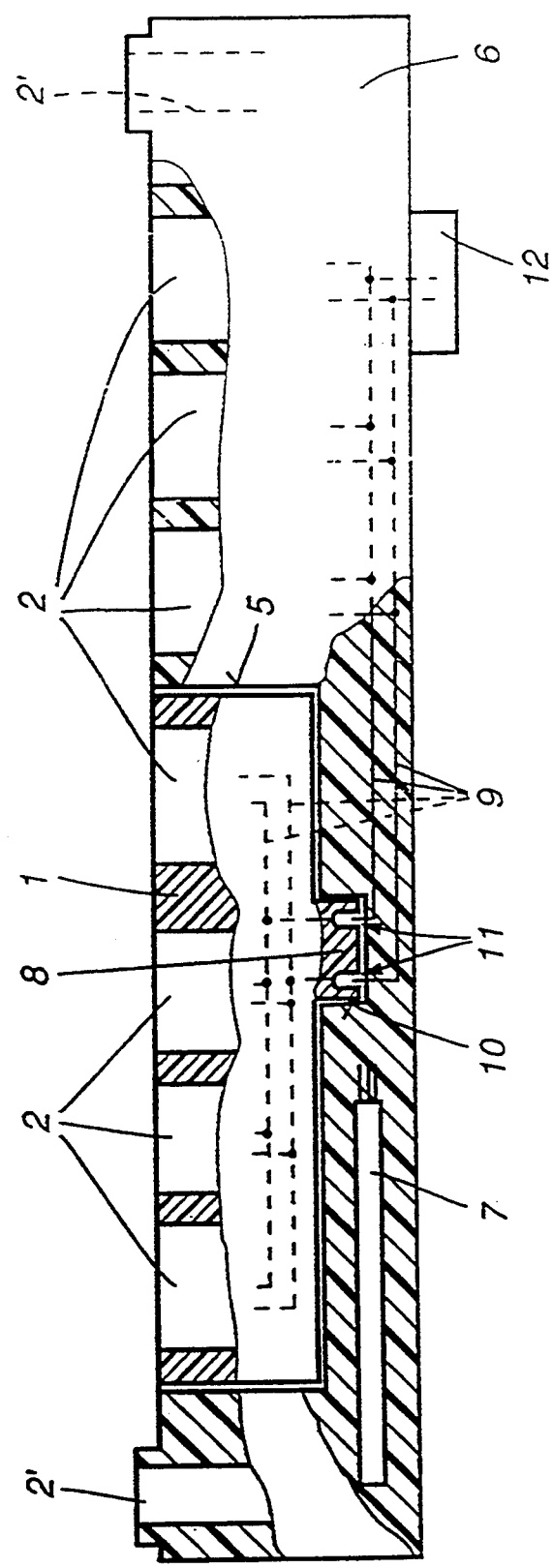
FIG. 2 is a cut-away side view of the switching-element block having two base-body modules shown in FIG. 1E plugged into one another.

The sectional view of the switching-element block SB in FIG. 2 shows how the first base-body module 1 is inserted into the plug holder 5 in the third module 6, and also the arrangement of the plug-in locations 2 and 2' in a straight line. The switching elements 3.1 etc. are omitted here.

Furthermore, the first base-body module 1 has an electrical external connection 8 for two electrical conductors 9 which run in the base-body module and, in a known manner which need not be shown in greater detail, have contact surfaces for each plug-in location 2. When the switching elements 3.1 are inserted into the plug-in locations 2, these contact surfaces make contact with corresponding external connections on the switching elements 3.1, so that the conductors 9 can be used jointly for all the switching elements 3.1.

The conductors 9 can, for example, provide a central supply for the positive and ground for illuminating the switching elements 3.1 and their push buttons when the vehicle lighting is switched on, which considerably reduces the cabling complexity when there is an increasing number of switching elements to be plugged in.

The other electrical connections for the switching elements 3.1 in the first base-body module 1 can also be passed over centrally in this manner (again not shown for reasons of simplicity).

If, as is shown in FIG. 1, the plug-in locations 2 are open at the bottom, the switching elements 3.1 and 3.2 can also still be wired up individually, which is consistent with the previously mentioned variable functional allocation of the plug-in locations 2.

A plug-in connection 10, which corresponds with the external connection 8, is provided in the plug holder 5 of the third base-body module 6. The plug holder 5 holds the first module 1 so that, when the first module 1 is inserted into the third module 6, an electrical plug connection of the electrical leads which are to be passed over is made at the same time, as is indicated by suitable symbols for a coupling 11. Incorrect installation is precluded by mechanical shape coding, i.e. the first base-body module 1 can be inserted only in the correct position in the plug holder 5 of the second module or of the third module.

Finally, the arrangement of the controller 7 as well as supply leads (which are partially visible) in the third base-body module 6 is shown schematically. The module 6 is also provided with an external connection 12 in order to connect it to the electrical vehicle on-board power system.

It should be noted that the plug holder 5 in the second base-body module 4 has a corresponding plug connection 9 for, of course, holding the external connection 7 of the first base-body module 1 (not shown in further detail).

In order to show a sectional view of only the second base-body module 4 with the inserted first module 1, only the two plug-in locations 2' on the right and left and the controller 7 have to be omitted in FIG. 2.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A modular switching-element block, comprising a first base body module, a plurality of individual plug-in locations in the first base body module for individually holding a standard fit of switching elements having electrical switches, and at least one additional base-body module provided with a separate plug holder configured to surround the first base-body module and with a number of adjacent but separate plug-in locations for individually and separately holding additional switching elements.

2. The switching-element block according to claim 1, wherein the plug-in locations for the switching elements lay in a straight line when the base-body modules are joined.

3. The switching-element block according to claim 1, wherein, in addition to plug-in locations for certain of the additional switching elements, the at least one additional base-body module is provided with a controller operatively connected to selected ones of the switching elements for power control of electrical loads allocated thereto.

4. The switching-element block according to claim 3, wherein the plug-in locations for the switching elements lay in a straight line when the base-body modules are joined.

5. The switching-element block according to claim 3, wherein the at least one additional base-body module provided with the controller further comprises a plug holder for the insertion of a smaller base-body module.

6. The switching-element block according to claim 4, wherein the plug holder in base-body module of the at least one additional base-body module, in order to replace the second base-body module, has plug-in locations whose number and arrangement correspond to the plug-in locations in said second base-body module.

7. The switching-element block according to claim 1, wherein at least one electrical conductor is provided inside at least one of the first base-body module and the at least one additional base-body module for making common electrical contact with a plurality of the switching elements, each base-body module being provided with the at least one electrical conductor and being insertable into a plug holder in the at least one additional base-body module having an external connection for operatively connecting the at least one electrical conductor, and the plug holder has an electrical plug connection with a coupler for holding and making electrical contact with the external connection.

* * * * *